April 7, 1953
A. C. HOFFMAN
2,634,057
CAR HEATER CONTROL
Filed April 13, 1949
2 SHEETS—SHEET 1
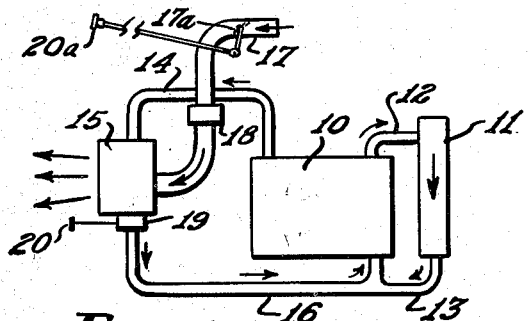
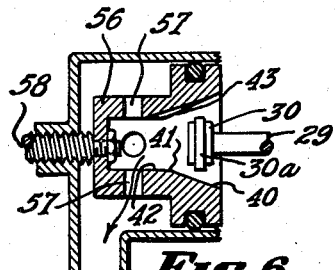
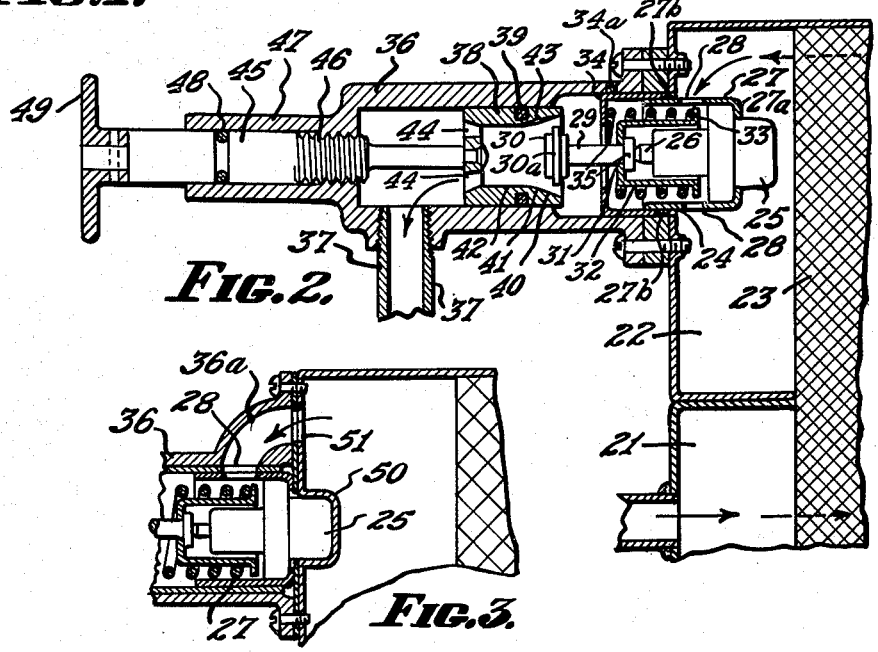
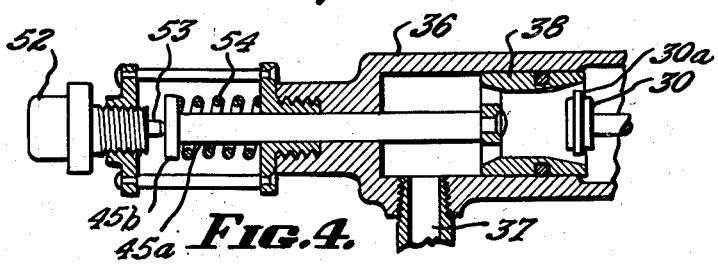
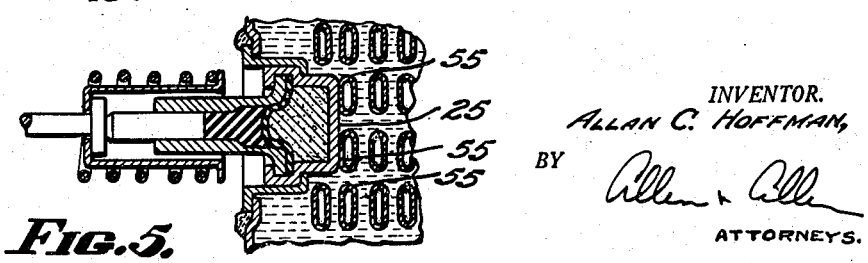
INVENTOR.
ALLAN C. HOFFMAN,
BY
ATTORNEYS.

April 7, 1953  A. C. HOFFMAN  2,634,057
CAR HEATER CONTROL

Filed April 13, 1949  2 SHEETS—SHEET 2

INVENTOR.
ALLAN G. HOFFMAN,
BY
ATTORNEYS.

Patented Apr. 7, 1953

2,634,057

UNITED STATES PATENT OFFICE 2,634,057

CAR HEATER CONTROL

Allan C. Hoffman, Yellow Springs, Ohio, assignor to Vernay Laboratories Inc., Yellow Springs, Ohio, a corporation of Ohio Application April 13, 1949, Serial No. 87,220

8 Claims. (Cl. 236—40)

This invention relates to a car heater control which is adapted to control a hot water heating system for automobiles, whether it be of the type where fresh air is introduced into the car through a so-called ram duct, or of the recirculating type.

The adequate and regular heating of the passenger compartment of an automobile presents numerous difficult problems. In the past car heaters have been controlled manually or automatically in a number of ways: for example, a valve was provided in the water line in series with the car heater and was controlled from the instrument panel. This valve was simply a mechanical device to regulate the flow of water through the heater and this flow could be increased or decreased depending upon the temperature desired. As long as all conditions involved remained constant, this gave a good control for the passenger compartment temperature. However, conditions do not remain constant because engine speed, car speed, engine water temperature, wind velocity and direction are always changing. The result is that in a control of this type the operator has to adjust the control valve constantly in order to maintain even a fairly satisfactory car temperature.

Another system has been to endeavor to control the temperature in the passenger compartment by means of a thermostat subjected to the passenger compartment air temperature. This system is well adapted to static conditions but it does not work in an automobile for the reason that temperature and other conditions can change very much more rapidly than the thermostat can correct for them. The flow of water can change very rapidly with engine speed, and likewise the temperature of the water can change very rapidly with engine speed. Furthermore, heat losses from the passenger compartment can change extremely rapidly when the automobile goes from a static condition to movement at a very high speed. Attempts have been made to correct this condition by causing the thermostat to be affected by a combination of air out of the heater and car air. This method has resulted in some improvement, although the thermostat still cycles, which results in uncomfortable hot and cold blasts of air from the heater.

More recently car manufacturers have gone to the so-called ram duct in which two ducts are provided leading into the passenger compartment, one of which is used only in the summertime to introduce fresh air into the car. It is provided with a butterfly valve manually adjustable from the dashboard. The other duct is usually provided with a small blower and is used in connection with a heater heated by hot water from the engine jacket. The introduction of fresh outside air for heating has numerous advantages over all recirculating systems in that it tends to eliminate condensation of moisture on the windshield and windows, and to eliminate the accumulation of cigarette smoke and stale air. On the other hand, the use of the ram duct enhances certain of the problems by virtue of the fact that the air velocity through the ram duct varies with the speed of the car, and of course with the speed and direction of the wind. This is, to some extent compensated for by the small blower in the ram duct.

In considering the problem of car heating the most important factor to be considered is that having to do with the temperature of the air coming from the heater. With the recirculation of air through the passenger compartment determined by the introduction of fresh outside air through the ram duct, and the exhaust of the passenger compartment air through a slightly cracked rear window, the actual car temperature at any instant is primarily a function of the temperature of the incoming air from the heater into the passenger compartment. It has been found by experiment that the incoming air from the heater should be slightly warmer than the desired car temperature to compensate for heat losses from the car. However, fluctuations in the air temperature coming from the heater must be held to a minimum to insure maximum comfort. I have found, in connection with a 1949 Ford, for example, that with an outside temperature of about 25° F. the outlet temperature from the heater should be about 100° F. in order to maintain approximately a 75° F. car temperature. These figures will vary slightly with other makes of automobiles, and have been given only by way of example.

A study of the relationship between outside air temperature, ram air temperature, water temperature in and out of the heater, air temperature in and out of the heater and car temperatures in connection with speeds of travel, has shown that changes in water flow and air flow, and water and air temperatures, were of considerable magnitude during normal driving operations. It was found that while both air flow and water flow increase as the car speed increases, the proportionate relationship from a heat balance standpoint does not hold throughout the normal driving speeds of an automobile.

With the foregoing considerations in mind it is an object of the present invention to provide a car heating system in which the temperature of the passenger compartment is controlled by controlling the temperature of the air coming out of the heater. It is another object of the invention to control the temperature of the air coming out of the heater by controlling the flow of water through the heater.

It is still another object of the invention to control the flow of water through the heater on the basis of the temperature of water coming from the heater.

It is thus an object of the invention to provide a thermostat in heat exchange relationship with the hot water leaving the heater and causing such thermostat to control a valve which determines the flow of hot water through said heater.

It is a very important object of my invention in achieving the most perfect car temperature control as mentioned above, to provide an adjustable valve seat for said valve and to provide a second thermostat, exposed to car air temperature, to adjust the position of said valve seat.

These and other objects of the invention which will be pointed out in more detail hereinafter, or which will be apparent to one skilled in the art upon reading these specifications, I accomplish by that certain construction and arrangement of parts of which I shall now describe certain exemplary embodiments. While I have illustrated the invention in connection with a heating system of the type where fresh outside air is introduced through a ram duct, it will be understood that my invention is equally applicable to a recirculating type of system. Throughout the specification and claims where the term "water" is used, it is to be understood to include water containing antifreeze in any concentration up to and including 100%.

Reference is made to the drawings forming a part hereof and in which:

Figure 1 is a diagram representing the flow of water and air in a heating system according to my invention;

Figure 2 is a cross-sectional view through a thermostat and valve showing a portion of the heater and a manual control;

Figure 3 is a fragmentary view similar to Figure 2 showing a different way of mounting the thermostat;

Figure 4 is a fragmentary view similar to Figure 2 showing the manual control replaced by a thermostatic control;

Figure 5 is a fragmentary view similar to Figure 3 showing yet another way of disposing of the thermostat in relation to the heater;

Figure 6 is a fragmentary cross-sectional view through a valve seat of modified construction;

Figure 7:
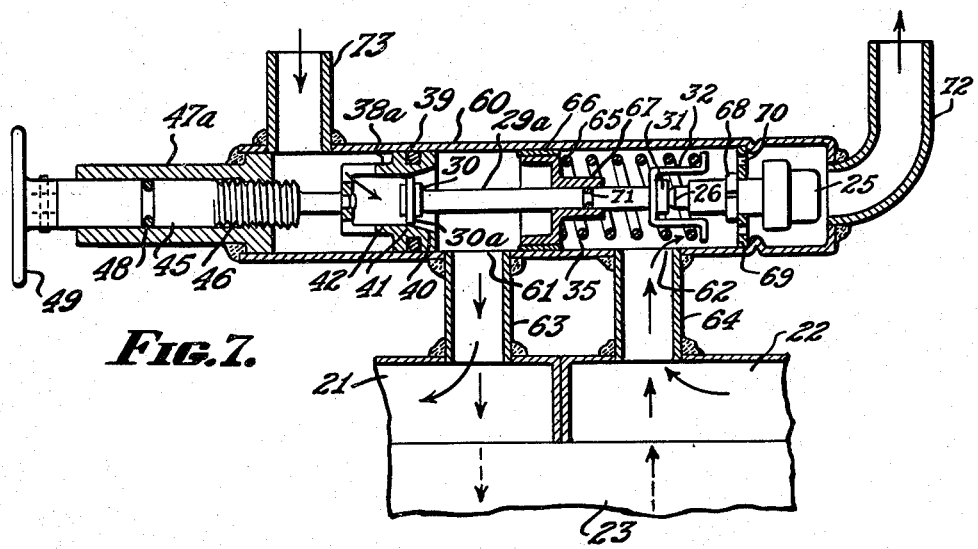
Figure 7 is a fragmentary cross-sectional view of an arrangement in which the thermostat is subjected to the outlet water temperature, while the valve controlled thereby is in the inlet water line.

In the diagrammatic representation of Figure 1 the engine is indicated at 10 and its radiator at 11. A circuit of water from the engine jacket through the radiator is indicated by the pipes 12 and 13. A pipe 14 leads hot water from the engine jacket to the heater indicated generally at 15, from whence the water returns through a pipe 16 to the engine 10. 17 designates a ram duct provided with a butterfly type valve 17a, and a blower 18 through which fresh outside air is supplied to the heater 15. The control valve and thermostat are indicated generally at 19 and a manual control for the valve seat is shown at 20, and a manual control for the valve 17a is shown at 20a. The basic theory and feature of the present invention is illustrated in connection with Figure 1. It will be observed that the thermostat is placed at the outlet of the hot water from the heater and that it controls a valve at the outlet from the heater so that the flow of water through the heater is regulated by a thermostat responsive to the temperature of the water leaving the heater. Thus, if the outside air is cold and abstracts more heat from the water in the heater, the outgoing water will be colder. In response to the drop in temperature of the outgoing water the thermostat will open the valve to permit more hot water to flow through. Conversely, if the outside temperature is warmer so that the heater abstracts less heat from the water, the thermostat in response to the warmer temperature of the outgoing water will close the valve so that a small flow takes place. The same situation obtains if the entering air temperature is constant but the mass of the air flow increases or decreases; this will have the effect of lowering or raising the outlet water temperature respectively.

Referring now to Figure 2, I have shown a conventional car hot water heater having an inlet heater 21, an outlet header 22 and a core 23. The core will generally be composed of a plurality of slender tubes through which the air flows and through which the heat from the water is transferred to the air. Water flows through the heater in the direction of the arrows in Figure 2. The outlet header tank 22 is provided with an aperture 24 into which the sensing element 25 of the thermostat extends. The thermostat I prefer to use is one available commercially under the name Vernatherm. This thermostat has a cup element indicated at 25 which is filled with a heat sensitive material which undergoes a molecular rearrangement under the influence of heat. The thermostat has a piston 26 which is thrust out from the thermostat under the influence of the increase in temperature.

The thermostat is held in a cup-shaped element 27, which is provided with apertures 28 for the passage of water. The piston 26 is connected to a valve stem 29 of a valve 30. The stem 29, or the piston 26, is provided with a shoulder 31. The cup-like member 32 embraces the thermostat and is provided with a flange 33 and has a hole for the passage of the valve stem 29. The cup member 27 is secured to another cup-like element 34, as by silver solder or the like at 27b, and a compression spring 35 bears at one end against the member 34, and at its other end against the flange 33. The cup member 27 is flanged at 27a in order to seat the sensing element 25. The spring 35 serves as a spring return for the thermostat. It is a characteristic of this type of thermostat that when the sensing element is cooled down the piston thereof must be forced back since it does not return of its own accord. The valve 30 is provided with a disc 30a, which may be of synthetic rubber or similar material.

A thermostat and valve housing 36 to which the cup members 34 and 27 are secured, as by silver solder or the like at 34a, is screwed or otherwise suitably attached to the outlet header tank as shown.

The housing 36 is provided with an outlet fitting 37 and carries on its interior a valve seat member 38. The valve seat member is provided with a suitable sealing means as indicated at 39 and has a conical valve seat 40. In order that the closing of the valve may take place gradually, I have found that the ideal apex angle of the valve seat 40 is on the order of 40°. In other words, any element of the conical surface 40 makes an angle of about 20° with the axis of the valve. This angle is based on the motion-temperature curve of the thermostat and the heating requirements of the car, so as to achieve fairly constant air-out temperature regulation even with relatively high outside air temperature, and to avoid violent cycling of the air-out temperature which would result from repeated opening and closing the valve. The frusto-conical surface 40 merges by means of a curve 41 into a cylindrical portion 42 which is of a diameter to fit snugly the diameter of the disc 30a. The valve seat is provided with a metering groove 43 which extends from a point in the conical surface just outside the curve 41 to a point in the cylindrical surface 42 at a depth of about twice the thickness of the disc 30a, so that when the disc 30a is entirely closed in the cylindrical portion 42 a very slight flow of hot water can still pass through the valve, whereby the sensing element 25 of the thermostat will respond more quickly to a temperature change, tending to a re-opening of the valve.

The purpose of the construction described above will now be set forth. It is very important that the valve be capable of being shut off entirely for summer use. It is also necessary with a thermostat of this type that some provision be made for over-travel of the thermostat. The cylindrical configuration of the valve seat as indicated at 42 enables the disc 30a of the valve to travel after shut-off of the valve and eliminates the necessity for any special over-ride device. By adjustment of the handle 49 to be described hereinafter it is possible to shut off the valve entirely also by moving the valve seat member to a point where the disc 30a is in contact with the unbroken cylindrical surface 42, beyond the metering groove.

In normal driving, however, the disc 30a never quite enters the cylindrical portion 42. Also, in normal driving with relatively low outside temperature the metering groove is of no significance because its cross-sectional area is substantially negligible in relation to the flow area of the valve in the region of the conical surface 40. When, however, the outside air temperature is relatively high, say from 40° to 50° F. and a slight amount of heating is desired, the amount of flow of water through the heater will be extremely small; it may amount to a pint per minute, or even less. The metering of such a small flow of water presents many difficulties. If the diameter of the valve seat and disc were made much smaller, the metering of flow at such relatively high outside temperatures would not be a great problem. But in order to provide sufficient flow where maximum heating is required those diameters must be relatively large. Thus, with the valve designed for maximum performance, where the outside air temperature is relatively high the valve will alternately open and close. During its closed position all flow of water through the heater will stop and the air temperature out of the heater will drop rapidly in a matter of a few seconds to an uncomfortable degree. The metering groove 43 comes into play when the disc 30 is almost at the point of engaging the cylindrical surface 42, and permits a very slight flow of water which I have found will prevent the violent cycling which is objectionable.

The valve seat member 38 is of generally cup-shape and is provided with the passages 44 for the water passing through the valve. The valve seat member is suitably secured to a control member indicated generally at 45, which is provided with a threaded portion 46 having threaded engagement in an extension 47 of the housing. Suitable sealing means for the member 45 are provided as at 48 and a handle member is provided at 49. It will be observed that a rotation of the handle member 49 serves to adjust the position of the valve seat member 38 in relation to the valve disc 30. The handle member 49 which corresponds to the member 20 of Figure 1 may extend into the passenger compartment so that the operator may manually adjust the temperature at which the valve will close. By adjustment of the handle member 49 the valve seat can be retracted to the point that the valve cannot close, regardless of water temperature. Similarly the valve seat can be advanced to the point where the valve cannot open no matter how cold the water in the outlet header tank may get. Thus the operator has complete control over the heater and can override the thermostat if he desires.

In Figure 3 I have shown a modification in the mounting of the thermostat on the outlet header tank. As there shown a wall of the outlet header tank is provided with a depression 50 of a size to accommodate the sensing element 25 of the thermostat. An aperture is provided in a wall of the outlet header tank and the housing member 36 is modified to the extent of providing a duct 36a through which outlet water from the heater flows into the valve. For this purpose also the hole 28 in the cup member 27 is made to register with the duct 36a. In all other respects the arrangement of Figure 3 is the same as that of Figure 2. In many cases it will be a cheaper installation in the manufacture of the heater to provide a depression 50, rather than to provide a large hole into which the entire unit extends as shown in Figure 2.

In Figure 4 I have shown a slight modification in which the valve seat member 38 is adjusted as to its position automatically by means of a second thermostat indicated generally at 52. The thermostat 52 subjected to car air temperature, and its piston 53, bears against a rod 45a which is secured to the valve seat member 38. As described above a compression spring 54 bears against the end of the housing 36 at one end and against the shoulder 45b on the rod 45a. The purpose of this spring end is to return the piston 53 when the car air temperature drops. The only difference between the structure of Figure 4 and that of Figure 2 is that the position of the valve seat member 38 is thermostatically controlled rather than manually controlled. However, the thermostat 52 can be screwed in or out manually to give the operator the same over-ride feature disclosed above in connection with the member 49.

In Figure 5 I have shown yet another modification in the mounting of the thermostat in the heater outlet header tank. In this case the sensing element 25 of the thermostat is made to contact one or more of the tubes 55 through which the air to be heated flows. Thus, the sensing element of the thermostat is not only in heat exchange relationship with the hot water flowing through the outlet header tank, but also in heat exchange relationship with at least one of the airflow tubes therein. The external portion of the mounting may be as disclosed in any of the other figures. While I have shown the valve and thermostat in or immediately adjacent the outlet header tank, in some cases it may be found desirable to install them in the hose line leading from the outlet header tank back to the engine. While such an arrangement is not as good or as cheap as any of those shown, it is of course within the scope of my invention. Installation costs will be lower when the valve and thermostat are a part of the heater unit.

In Figure 6 I have shown a modification in the valve seat structure wherein the valve seat is no longer cup-shaped as in the other figures, but is provided with a boss 56 which is provided with the apertures 57 for the passage of water. A manual control element is again indicated at 58. This may be similar to that shown in Figure 2. In Figure 6 the configuration of the valve seat is more clearly shown and the reference numerals are the same as those used in the description of Figure 2.

In some present day automobiles, the water pump which produces circulation of the water through the engine jacket, radiator and heater, is such that, under certain conditions, a pressure as high as 50 pounds per square inch is built up. In such cases it will be desirable that the valve controlling flow through the heater core be on the inlet side of the heater. According to my invention, however, it is necessary that the thermostat still be subject to the outlet water temperature.

I have shown in Figure 7 an arrangement of this kind. Wherever possible the reference numerals identifying certain parts are the same as in the other figures. The thermostat 25 with its piston 26, the valve stem 29a and valve disc 39a, the valve seat member 38a, and manual control shaft 45, are incorporated in a generally tubular housing 60 having ports 61 and 62 which are connected by the nipples 63 and 64 to the inlet and outlet header tanks 21 and 22 respectively. The valve stem 29a is elongated so that both the valve and seat members are to the left of the inlet port 61, while the thermostat is to the right of the outlet port 62. Between said ports is a dividing element 65 having its flange 66 welded or otherwise suitably secured to the walls of the housing 60. The member 65 is provided with a bearing boss 67 for the valve stem 29a. The thermostat is held in place by means of a snap ring 68 bearing against a perforated annulus 69, which in turn bears against the annular bead 70. The spring 35, bearing at one end against the member 65, bears at its other end against the member 32, which in turn engages the shoulder 31 on the valve stem. The valve stem is sealed against its bearing boss 67 as indicated at 71. The outlet hose connection is made to the outlet nipple 72, and the inlet hose connection to the inlet nipple 73.

From the above description it will be clear that the water entering the heater passes first through the valve and then into the heater core. The outlet water flows past the thermostat as before, and the thermostat directly actuates the valve. The major difference in this arrangement is that the valve is on the inlet side of the heater instead of the outlet side.

Figure 8:
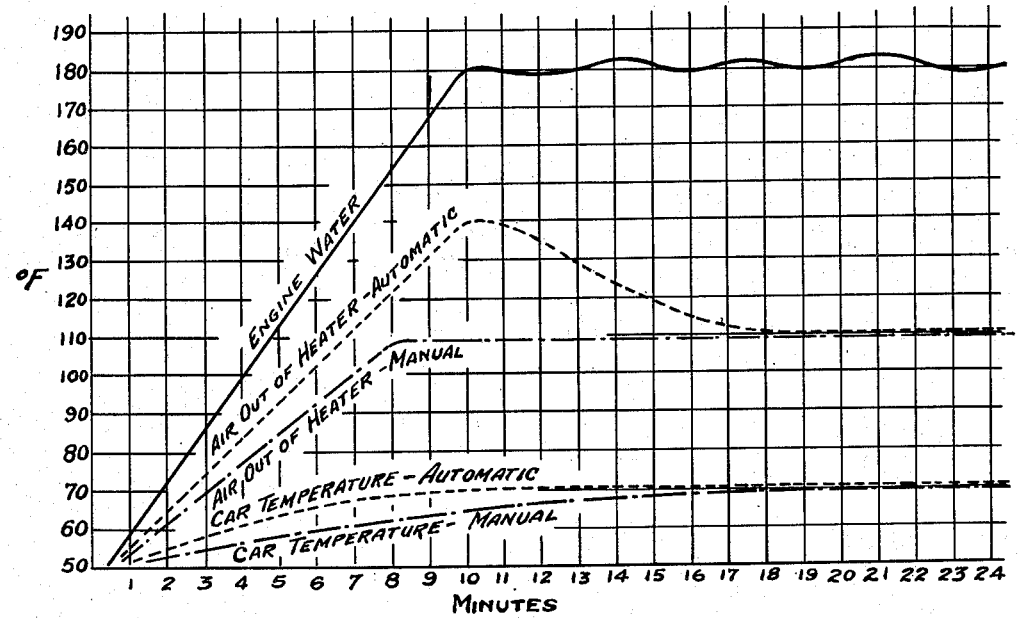
Figure 8 is a graph showing temperature-time curves for engine water, air out of heater, and car air with different controls.

In Figure 8 I have shown time in minutes plotted against temperature in degrees F., showing the engine water temperature curve rising steadily until it reaches about 180° F. in about 10 minutes, after which it cycles with variations in engine speed and air speed. Where the manual control is provided and is not used, the air out of heater temperature rises to, say, 110° F. in about 8 minutes, and then holds at that level, while the car air temperature rises very slowly and does not reach substantially 70° F. for about 20 minutes. On the other hand, where the arrangement of Figure 4 is used the air-out of heater temperature is brought rapidly up to about, say, 140° F. in a matter of 10 minutes, and therefore the car air temperature rises much more rapidly and will reach 70° F. in about 9 minutes. Then the car air thermostat regulates the valve seat so that the air out of the heater temperature is reduced to about 110° F., while the car air temperature is held at 70° F. The same result substantially may be accomplished by actuating the manual control, but the operator is likely to forget to return the manual control to normal position, with the result that the car will be overheated. The temperatures and times given above are exemplary only and do not constitute a limitation upon my invention.

While I have described various details of construction, it will be understood that these may be varied considerably without departure from the spirit of my invention. The basic principle of my invention is the provision of a thermostat having its sensing element in heat exchange relationship with the hot water leaving the outlet header tank of a hot water type car heater and having a valve for controlling the flow of water from the outlet header tank, which valve is operated by the thermostat. In this way the outlet temperature of the water passing through the heater can be quite accurately controlled and, as discussed hereinabove, it is the accurate control of the outlet water temperature which enables me to control accurately the air-out temperature from the heater. Again, as pointed out above, accurate control of the air-out temperature of the heater leads to accurate control of the air temperature in the passenger compartment. The thermostat being subjected to the temperature of the water in the outlet header is almost instantaneously responsive to changes in that outlet water temperature, and therefore the flow of water through the heater is immediately controlled, and thereby the temperature of the air is immediately controlled. I have found that this immediate control of the air-out temperatures enables me to maintain a substantially constant temperature in the passenger compartment.

It will therefore be understood that the various details are not to be considered in any way as limiting otherwise than as set forth in the claims which follow.

Having now fully described my invention what I claim as new and desire to secure by Letters Patent is:

1. In a hot water car heater, a thermostat having its sensing element disposed in heat exchange relationship with the water as it leaves the heater, a valve for controlling the flow of water through said heater, said valve being operated by said thermostat and having a movable seat and means for moving said seat, said valve being of disc form and said seat being of frusto-conical form merging into a cylindrical form of a diameter substantially equal to that of said disc, whereby the flow of water is gradually diminished as said valve moves to closed position, whereby said valve may override after the flow of water is completely cut off, and whereby the closing point of said valve may be varied by movement of said seat.

2. A device according to claim 1, in which said frusto-conical seat portion has an apex angle of substantially 40°.

3. A device according to claim 1, in which the sensing element of said thermostat is also in heat exchange relationship with an air flow tube in said heater.

4. A device according to claim 1, in which said heater has an inlet header tank, a heater core composed of a number of tubes through which the air to be heated flows, and an outlet header tank, and in which a wall of said outlet header tank has a cup-like depression, said thermostat being mounted on said wall with its sensing element in said depression and in heat exchange relationship through said wall with the water in said outlet header tank.

5. A device according to claim 1, in which said means for moving said seat comprises a second thermostat having its sensing element in heat exchange relationship with the air in said car, and operatively connected with said valve seat, whereby to adjust the position of said valve seat in response to changes in the air temperature in said car.

6. A device according to claim 1, in which said means for moving said seat is manually operable.

7. A device according to claim 6, in which said valve is disposed adjacent the outlet from said heater.

8. A device according to claim 6, in which said valve is disposed adjacent the inlet to said heater.

ALLAN C. HOFFMAN.

REFERENCES CITED

The following references are of record in the file of this patent:

UNITED STATES PATENTS

| Number | Name | Date |
| --- | --- | --- |
| 1,850,963 | Sponar | Mar. 22, 1932 |
| 1,906,994 | Modine | May 2, 1933 |
| 2,019,303 | Hall | Oct. 29, 1935 |
| 2,065,148 | Nallinger | Dec. 22, 1936 |
| 2,075,498 | Bondurant | Mar. 30, 1937 |
| 2,213,018 | Perkins | Aug. 27, 1940 |
| 2,273,000 | Hans | Feb. 10, 1942 |
| 2,300,011 | Rose | Oct. 27, 1942 |
| 2,470,503 | Levine | May 17, 1949 |
| 2,480,676 | Shaw | Aug. 30, 1949 |